(12) United States Patent
Mah et al.

(10) Patent No.: US 12,744,220 B2
(45) Date of Patent: Sep. 22, 2026

(54) POROUS COMPOSITE, ANODE AND LITHIUM BATTERY EACH INCLUDING SAME, AND METHOD FOR PREPARING SAME

(71) Applicant: SAMSUNG SDI CO., LTD., Yongin-si (KR)

(72) Inventors: Sangkook Mah, Yongin-si (KR); Inhyuk Son, Yongin-si (KR); Sungnim Jo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 821 days.

(21) Appl. No.: 18/003,842

(22) PCT Filed: Jul. 20, 2021

(86) PCT No.: PCT/KR2021/009316

§ 371 (c)(1),
(2) Date: Dec. 29, 2022

(87) PCT Pub. No.: WO2022/019605

PCT Pub. Date: Jan. 27, 2022

(65) Prior Publication Data

US 2023/0261202 A1 Aug. 17, 2023

(30) Foreign Application Priority Data

Jul. 21, 2020 (KR) ........................ 10-2020-0090564

(51) Int. Cl.
*H01M 4/62* (2006.01)
*C01B 32/194* (2017.01)
(Continued)

(52) U.S. Cl.
CPC ........... *H01M 4/625* (2013.01); *C01B 32/194* (2017.08); *H01M 4/133* (2013.01);
(Continued)

(58) Field of Classification Search
CPC .. H01M 4/625; H01M 4/133; H01M 10/0525; H01M 2004/021;
(Continued)

(56) References Cited

U.S. PATENT DOCUMENTS 9,093,711 B2 7/2015 Sheem et al.
10,249,871 B2 4/2019 Son et al.
(Continued)

FOREIGN PATENT DOCUMENTS

CN 106554011 A 4/2017
CN 106887567 A 6/2017
(Continued)

OTHER PUBLICATIONS

Japanese Notice of Allowance dated Dec. 23, 2024, issued in Japanese Application No. 2023-504395, 4 pages.
(Continued)

*Primary Examiner* — Nicholas A Smith
*Assistant Examiner* — Benjamin Eli Kass-Mullet
(74) *Attorney, Agent, or Firm* — Womble Bond Dickinson (US) LLP

(57) ABSTRACT

Provided are a porous composite, an anode and a lithium battery each including the same, and a method of preparing the porous composite. The porous composite includes nanopores and graphene, wherein the nanopores are arranged in a graphene matrix including the graphene, and a size of the nanopores is about 50 nm or less.

19 Claims, 8 Drawing Sheets

(51) Int. Cl.
*H01M 4/02* (2006.01)
*H01M 4/133* (2010.01)
*H01M 10/0525* (2010.01)

(52) U.S. Cl.
CPC ..... *H01M 10/0525* (2013.01); *C01P 2004/34* (2013.01); *C01P 2004/61* (2013.01); *H01M 2004/021* (2013.01); *H01M 2004/027* (2013.01)

(58) Field of Classification Search
CPC ............ H01M 2004/027; C01B 32/194; C01P 2004/34; C01P 2004/61
See application file for complete search history.

(56) References Cited

U.S. PATENT DOCUMENTS

| | | | | |
|---|---|---|---|---|
| 11,302,904 | B2 | 4/2022 | Kim et al. | |
| 11,695,107 | B2 | 7/2023 | Choi et al. | |
| 2009/0136809 | A1* | 5/2009 | Wang | B82Y 30/00 429/129 |
| 2013/0230709 | A1* | 9/2013 | Zhou | H01G 11/36 428/219 |
| 2014/0141334 | A1* | 5/2014 | Yoo | H01M 4/386 429/231.8 |
| 2014/0183415 | A1* | 7/2014 | Song | B82Y 30/00 252/502 |
| 2015/0093648 | A1* | 4/2015 | Son | B82Y 40/00 252/502 |
| 2015/0243969 | A1 | 8/2015 | Ku et al. | |
| 2015/0353767 | A1 | 12/2015 | Sugitani et al. | |
| 2015/0380728 | A1* | 12/2015 | Son | H01M 4/13 252/502 |
| 2018/0083272 | A1* | 3/2018 | Son | H10N 10/855 |
| 2019/0190015 | A1 | 6/2019 | Son et al. | |
| 2019/0381601 | A1 | 12/2019 | Matsuo et al. | |
| 2024/0286902 | A1 | 8/2024 | Hasegawa et al. | |

FOREIGN PATENT DOCUMENTS

| | | | |
|---|---|---|---|
| CN | 109755520 | A | 5/2019 |
| CN | 110828788 | A | 2/2020 |
| EP | 2854204 | A1 | 4/2015 |
| JP | 2014-507365 | A | 3/2014 |
| JP | 2014-518835 | A | 8/2014 |
| JP | 2015-164889 | A | 9/2015 |
| JP | 2019-217524 | A | 12/2019 |
| JP | 2020-066574 | A | 4/2020 |
| JP | 2021-84852 | A | 6/2021 |
| KR | 10-2012-0014498 | A | 2/2012 |
| KR | 10-2013-0040541 | A | 4/2013 |
| KR | 10-2015-0039555 | A | 4/2015 |
| KR | 10-2015-0101310 | A | 9/2015 |
| KR | 10-2015-0141473 | A | 12/2015 |
| KR | 10-2015-0141924 | A | 12/2015 |
| KR | 10-2015-0142137 | A | 12/2015 |
| KR | 10-1821348 | B1 | 1/2018 |
| KR | 10-2018-0031585 | A | 3/2018 |
| KR | 10-2019-0083613 | A | 7/2019 |
| KR | 10-2020-0058644 | A | 5/2020 |
| KR | 10-2022-0020850 | A | 2/2022 |
| WO | 2011/013855 | A1 | 2/2011 |
| WO | 2019/161288 | A1 | 8/2019 |

OTHER PUBLICATIONS

Korean Notice of Allowance dated Dec. 19, 2024, issued in Korean Application No. 10-2020-0090564, 8 pages.

Mo, Runwei, et al., "High-quality mesoporous graphene particles as high-energy and fast-charging anodes for lithium- ion batteries," Nature Communications, 2019, Article No. 1474, 10 pages.

Korean Office Action dated Jul. 27, 2023, issued in corresponding Korean Patent Application No. 10-2020-0090564 (4 pages).

El-Deen, A. G. et al. "Flexible 3D Nanoporous Graphene for Desalination and Bio-decontamination of Brackish Water via Asymmetric Capacitive Deionization," ACS Applied Materials & Interfaces, Sep. 2, 2016, 39 pages.

Japanese Office Action for JP Application No. 2023-504395 dated Jan. 15, 2024, 9 pages.

Huang, Xiaodan, et al. "Functional 1-9,12 INV. Nanoporous Graphene Foams with Controlled Pore Sizes," Advanced Materials, VCH Publishers, DE, vol. 24, No. 32, 2012, pp. 4419-4423.

Extended European Search Report issued in corresponding EP Application No. 21845378.5, dated Jun. 16, 2025 (12 pages).

* cited by examiner

POROUS COMPOSITE, ANODE AND LITHIUM BATTERY EACH INCLUDING SAME, AND METHOD FOR PREPARING SAME

CROSS-REFERENCE TO RELATED APPLICATION(S)

This application is a U.S. National Phase Patent Application of International Application No. PCT/KR2021/009316, filed on Jul. 20, 2021, which claims priority to Korean Application No. 10-2020-0090564, filed Jul. 21, 2020, the entire content of each of which is incorporated herein by reference.

TECHNICAL FIELD

One or more embodiments related to a porous composite, an anode and a lithium battery each including the porous composite, and a method of preparing the porous composite.

BACKGROUND ART

For small and high-performance devices, high energy density is a desirable factor for lithium batteries, in addition to small-size and light-weight characteristics. That is, high-capacity lithium batteries are increasingly desirable.

Also, high-speed charging and discharging in addition to high energy density becomes important in electric vehicles or energy storage systems (ESS). That is, a lithium battery capable of high-speed charging and discharging is becoming important.

conducting agents that may provide improved conductivity are being studied to manufacture a lithium battery suitable for the use.

Although graphene as well as conducting agents of the related art have been studied, theoretical physical properties of the graphene and conducting agents were difficult to be implemented due to aggregation of graphene during the process of electrode manufacture.

Therefore, there is still a need for a novel material capable of providing improved physical properties compared to general conductive materials of the related art.

DESCRIPTION OF EMBODIMENTS

Technical Problem

According to an aspect of one or more embodiments, a porous composite provides improved charging/discharging characteristics as compared to those of a carbonaceous material of the related art.

According to another aspect of one or more embodiments, an anode includes the porous composite.

According to another aspect of one or more embodiments, a lithium battery includes the porous composite.

According to another aspect of one or more embodiments, a method of preparing the porous composite.

Solution to Problem

According to an aspect of one or more embodiments, a porous composite includes nanopores and graphene, wherein the nanopores are arranged in a graphene matrix including the graphene, and a size of the nanopores is about 50 nanometers (nm) or less.

According to another aspect of one or more embodiments, an anode includes an anode active material and the porous composite.

According to another aspect of one or more embodiments, a lithium battery includes a cathode, an anode, and an electrolyte between the cathode and the anode, wherein the at least one of the cathode and the anode is the porous composite.

According to another aspect of one or more embodiments, a method of preparing a porous composite includes preparing a composite precursor including at least one selected from silica or a first metal oxide and $SiO_x$ (where $0<x<2$) or a second metal oxide by supplying and heat-treating a reaction gas formed in the form of a carbon source gas to the silica or the first metal oxide, and preparing a porous composite by removing at least one selected from the silica or the first metal oxide and $SiO_x$ (where $0<x<2$) or a second metal oxide from the composite precursor.

Advantageous Effects of Disclosure

According to one aspect of one or more embodiments, cycle characteristics of a lithium battery may be improved by including a composite including nanopores having a size of 50 nm or less and graphene.

BEST MODE

Figure 1A:
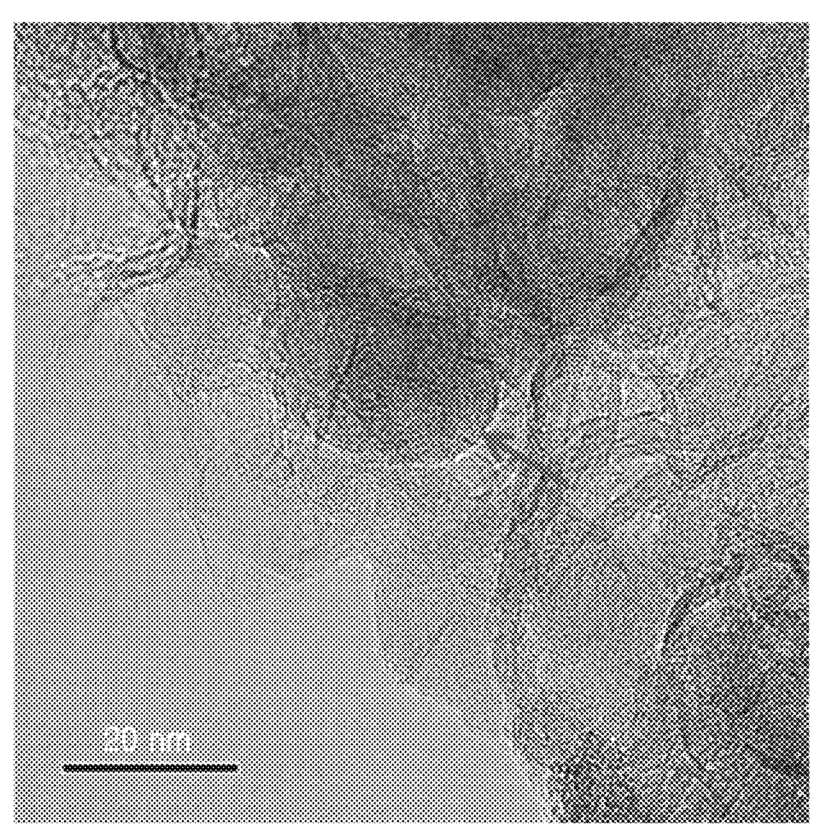
FIG. 1A is a high-resolution transmission electron microscope (HR-TEM) image of a composite precursor prepared in Example 1.
Figure 1B:
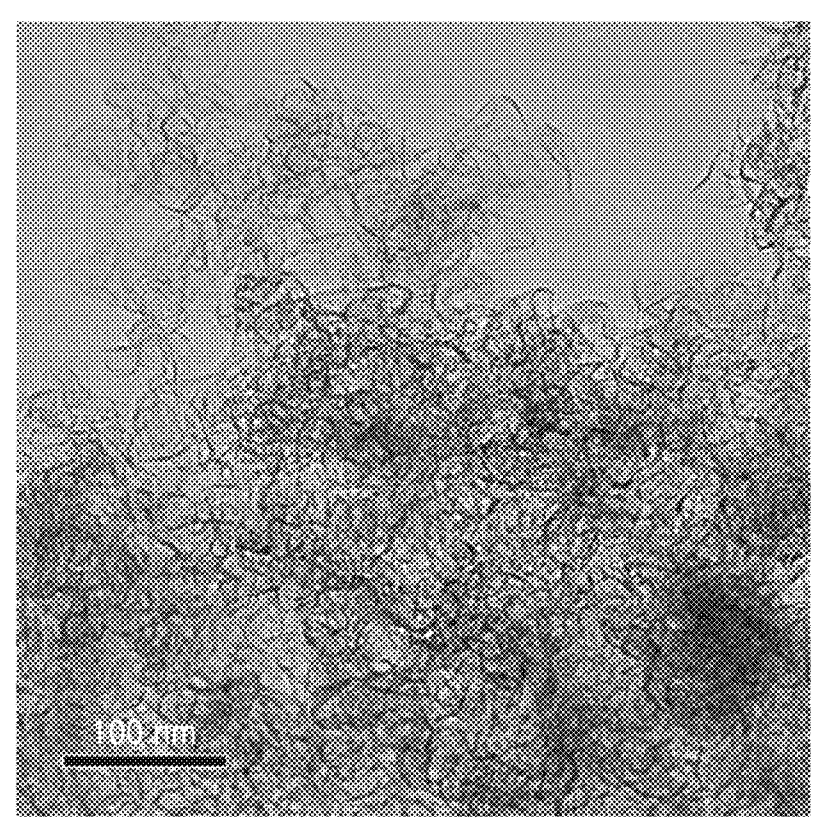
FIGS. 1B to 1E are HR TEM images of the porous composite prepared in Example 1.
Figure 1C:
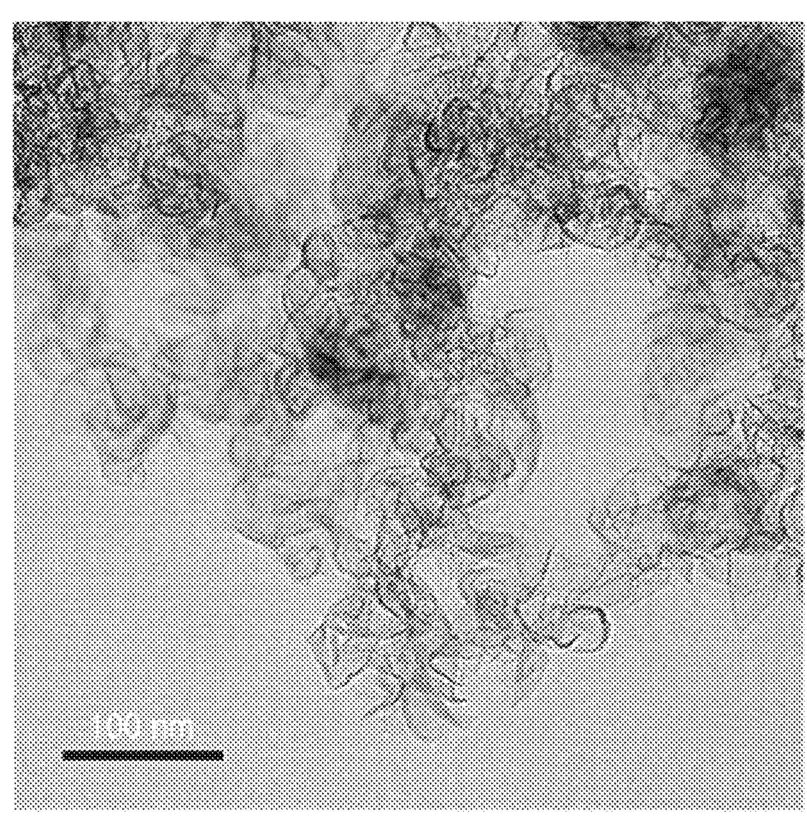

Hereinafter, as the present inventive concept allows for various changes and numerous embodiments, particular embodiments will be illustrated in the drawings and described in detail in the written description. However, this is not intended to limit the present inventive concept to particular modes of practice, and it is to be appreciated that all changes, equivalents, and substitutes that do not depart from the spirit and technical scope are encompassed in the present inventive concept.

The terms used herein are merely used to describe particular embodiments, and are not intended to limit the present inventive concept. An expression used in the singular encompasses the expression of the plural, unless it has a clearly different meaning in the context. As used herein, it is to be understood that the terms such as "including," "having," and "comprising" are intended to indicate the existence of the features, numbers, steps, actions, components, parts, ingredients, materials, or combinations thereof disclosed in the specification, and are not intended to preclude the possibility that one or more other features, numbers, steps, actions, components, parts, ingredients, materials, or combinations thereof may exist or may be added. The symbol "/" used herein may be interpreted as "and" or "or" according to the context.

In the drawings, the thicknesses of layers and regions are exaggerated or reduced for clarity. Like reference numerals in the drawings denote like elements. Throughout the specification, it will be understood that when a component, such as a layer, a film, a region, or a plate, is referred to as being "on" another component, the component may be directly on the other component or intervening components may be present thereon. Throughout the specification, while such terms as "first," "second," etc., may be used to describe various components, such components must not be limited to the above terms. The above terms are used only to distinguish one component from another.

Hereinafter, a porous composite, an anode and a lithium battery, each including the porous composite, and a method of preparing the porous composite according to embodiments will be described in detail.

A porous composite includes nanopores; and graphene, wherein the nanopores are arranged in a graphene matrix including the graphene, and a size of the nanopores is about 50 nanometers (nm) or less.

Graphene in the porous composite may provide high electric conductivity. Also, when the porous composite has a porous structure including the nanopores having a size of about 50 nm or less in the graphene matrix, the porous composite and an electrode active material may have excellent adhesive strength during preparation of an electrode. Therefore, cycle characteristics of an electrode including the porous composite may be improved.

A size of the nanopores in the porous composite may be calculated, for example, manually from a high-resolution transmission electron microscope (HR-TEM) image or automatically by a software. In some embodiments, a size of the nanopores in the porous composite may be measured by nitrogen adsorption. The size of the nanopores is, for example, a diameter of pores in the case of spherical pores, and the maximum value of a distance between two ends of a pore in the case of non-spherical pores. When graphene partially surrounds the nanopores, a size of the nanopores is twice a radius of curvature of the graphene surrounding the nanopores.

The graphene may have a bush-like structure, and the nanopores may be distributed in the bush-like structure.

The graphene may have, for example, a branched structure, and the nanopores may be distributed in the branched structure of the graphene. The branched structure of the graphene may include, for example, a plurality of graphene particles contacting each other. Since the carbonaceous material has a branched structure, various conductive paths may be provided.

The graphene may have, for example, a hemispherical structure, and the nanopores are distributed in the hemispherical structure. A size of the hemispherical structure may be, for example, about 50 nm to about 300 nm. As used herein, the term "hemispherical" may substantially refer to a hemispherical shape or any shape similar to a hemisphere. For example, the hemispherical shape may include a hemisphere and a semi-ellipse. When the structure is a hemisphere, a size of the structure may be twice the average radius of curvature. When the graphene has a spherical structure, the porous composite may be easily adhered to an electrode active material in an electrode.

The graphene may be, for example, a spherical structure, and the nanopores are distributed in the spherical structure. A size of the spherical structure may be, for example, about 50 nm to about 300 nm. As used herein, the term "spherical" may substantially refer to a spherical shape or any shape similar to a sphere. For example, the spherical shape may include a sphere and an ellipse. When the structure is a sphere, the size of the structure may be an average particle diameter of the sphere. When the structure is an ellipse, a size of the structure may be a major axis diameter of the ellipse. When the graphene has a spherical structure, the porous composite may be easily impregnated in an electrolyte solution.

The graphene may be, for example, a spiral structure, in which a plurality of spherical structures are connected. The nanopores may be distributed in the spherical structures of the spiral structure. A size of the spiral structure may be, for example, about 500 nm to about 100 μm. When the graphene has a spiral structure, the porous composite may be easily adhered to an electrode active material in an electrode.

The graphene may be, for example, a cluster structure, in which a plurality of spherical structures are agglomerated. The nanopores may be distributed in the spherical structures of the cluster structure. A size of the cluster structure may be, for example, about 0.5 mm to about 10 cm. When the graphene has a cluster structure, the porous composite may be easily adhered to an electrode active material in an electrode.

The porous composite may be, for example, a crumpled structure. The porous composite may be, for example, a faceted-ball structure. The crumpled faceted-ball structure may be, for example, a spherical structure. The nanopores may be distributed in the crumpled faceted-ball structure. When the porous composite is the crumpled faceted-ball structure, the porous composite may be easily adhered to an electrode active material in an electrode.

The porous composite may be, for example, a crumpled planar structure. The crumpled planar structure may be, for example, a spherical structure. The nanopores may be distributed in the crumpled planar structure. When the porous composite is the crumpled faceted-ball structure, the porous composite may be easily adhered to an electrode active material in an electrode.

An amount of the graphene in the porous composite may be, for example, about 90 parts by weight or more, about 95 parts by weight or more, about 98 parts by weight or more, about 99 parts by weight or more, or about 99.5 parts by weight or more, based on 100 part by weight of the total weight of the porous composite. The porous composite may be formed of, for example, graphene.

In the graphene, polycyclic aromatic molecules are formed when a plurality of carbon atoms are covalently bonded to each other, and the carbon atoms connected to each other by covalent bonding form a 6-membered ring as a basic repetition unit, or may further include a 5-membered ring and/or a 7-membered ring. As a result, the graphene may be shown as a single layer of the covalently bonded carbon atoms (generally, a sp2 bond). The graphene may be formed of a single layer or may be formed of a plurality of single layers laminated to form multi-layered graphene. The graphene may have, for example, 1 to 100 layers, 2 to 100 layers, or 3 to 50 layers that are laminated.

The graphene may have a degree of crystallinity of about 0.5 to about 1.5 or, for example, about 1.055 to about 1.146. The degree of crystallinity (or degree of disordering of graphene crystals) of the graphene may be obtained by measuring an intensity ratio of D peak to G peak (D/G) in a Raman spectra of the composite.

The graphene included in the porous composite may extend from the nanopores by a distance of 10 nm or less, and may include at least 1 to 20 graphene layers. For example, because a plurality of graphene layers are laminated, the graphene having a total thickness of 12 nm or less may be placed around the nanopores. For example, the total thickness of the graphene may be about 0.6 nm to about 12 nm. The graphene layer may partially or completely surround the nanopores. For example, referring to FIGS. 1D and 1E, the graphene layer having a plurality of layers has a shape of a sphere or a hemisphere and partially or completely surrounds around the nanopores.

A size of the nanopores in the porous composite may be, for example, about 1 nm to about 50 nm, about 1 nm to about 40 nm, about 1 nm to about 30 nm, about 1 nm to about 20 nm, about 2 nm to about 20 nm, about 5 nm to about 20 nm, or about 10 nm to about 20 nm. When the porous composite includes the nanopores having a size within these ranges, the porous composite may provide improved electronic conductivity.

The plurality of nanopores may be connected to each other and form secondary pores of various shapes. The secondary pores, in which the plurality of nanopores are connected, may have, for example, shapes of nanotubes. A cross-sectional length of the pores in shapes of nanotubes may be 500 nm or less or, for example, about 100 nm to about 300 nm. A diameter of the secondary pores having shapes of nanotubes may be about 50 nm or less, for example, about 1 nm to about 50 nm.

The porous composite may further include at least one selected from silica ($SiO_2$) and a reduction product of the silica, $SiO_x$ ($0<x<2$). The silica and/or $SiO_x$ ($0<x<2$) may not be removed during etching of the composite precursor including the silica and/or $SiO_x$ ($0<x<2$) and may intentionally or unintentionally remain in the nanopores. In this case, the porous composite may simultaneously include nanopores and silica and a reduction product of the silica. The reduction product of silica may be, for example, $SiO_{1.8}$, $SiO_{1.9}$, $SiO_{1.7}$, $SiO_{1.6}$, $SiO_{1.5}$, $SiO_{1.4}$, or $SiO_{1.3}$.

An amount of silicon (Si) included in the porous composite may be about 0.01 atom % to about 10 atom %, about 0.01 atom % to about 7 atom %, about 0.1 atom % to about 5 atom %, about 0.1 atom % to about 3 atom %, or about 0.1 atom % to about 1 atom %, based on the total amount of the porous composite. An amount of silicon (Si) included in the porous composite may be determined by an XPS spectrum. For example, as an amount of silicon (Si) in the porous composite is low, reduction in an initial efficiency by a reaction between a metal and lithium during charging and discharging may be prevented.

An average particle diameter of silica and a reduction product of the silica $SiO_x$ ($0<x<2$) may be measured using, for example, laser diffraction or dynamic light scattering. An average particle diameter of the silica and a reduction product of the silica $SiO_x$ ($0<x<2$) may be measured using, for example, a laser scattering particle size distribution measuring apparatus (e.g., a Horiba LA-920 particle size analyzer), and may be a median particle size (D50) value, for example, the particle size at 50% in a volume-based cumulative distribution of particle sizes. A uniformity deviation of at least one selected from silica and a reduction product of the silica, $SiO_x$ ($0<x<2$), included in the composite may be 3% or less, 2% or less, or 1% or less. For example, the uniformity may be obtained from the XPS. Therefore, the at least one selected from silica and a reduction product of the silica, $SiO_x$ ($0<x<2$), included in the composite may have a deviation of 3% or less, 2% or less, or 1% or less and may be uniformly distributed.

The porous composite may further include, for example, at least one metal selected from Groups 2 to 13, 15, and 16 of the periodic table and an oxide of the at least one metal. The metal and/or an oxide of the metal may be a metal and/or a metal oxide that are not removed during etching of the composite precursor including the metal and/or an oxide of the metal and may intentionally or unintentionally remain in the nanopores. In this case, the porous composite may simultaneously include nanopores and metal/metal oxide.

the porous composite may further include at least one selected from a first metal oxide and a second metal oxide, which is a reduction product of the first metal oxide.

The first metal oxide may be, for example, at least one represented by the formula $M_aO_b$ (where $0<a\leq3$, $0<b\leq4$, when a is 1, 2, or 3, b is an integer), the second metal oxide may be, for example, at least one represented by the formula $M_aO_c$ (where $0<a\leq3$, $0<c<4$, when a is 1, 2, or 3, c is not an integer), and b/a, which is a ratio of a and b of the first metal oxide, may be greater than b/c, which is a ratio of a and c of the second metal oxide. M may be at least one metal selected from Groups 2 to 13, 15, and 16 of the periodic table.

The metal included in the first metal oxide and the second metal oxide may be, for example, at least one selected from Al, Nb, Mg, Sc, Ti, Zr, V, W, Mn, Fe, Co, Pd, Cu, Ag, Zn, Sb, and Se. The first metal oxide may be, for example, selected from $Al_2O_3$, NbO, $NbO_2$, $Nb_2O_5$, MgO, $Sc_2O_3$, $TiO_2$, $ZrO_2$, $V_2O_3$, $WO_2$, $MnO_2$, $Fe_2O_3$, $Co_3O_4$, PdO, CuO, AgO, ZnO, $Sb_2O_3$, and $SeO_2$. The second metal oxide may be, for example, at least one selected from $Al_2O_z$ (where $0<z<3$), $NbO_x$ (where $0<x<2.5$), $MgO_x$ (where $0<x<1$), $Sc_2O_z$ (where $0<z<3$), $TiO_y$ (where $0<y<2$), $ZrO_y$ (where $0<y<2$), $V_2O_z$ (where $0<z<3$), $WO_y$ (where $0<y<2$), $MnO_y$ (where $0<y<2$), $Fe_2O_z$ (where $0<z<3$), $Co_3O_w$ (where $0<w<4$), $PdO_x$ (where $0<x<1$), $CuO_x$ (where $0<x<1$), $AgO_x$ (where $0<x<1$), $ZnO_x$ (where $0<x<1$), $Sb_2O_z$ (where $0<z<3$), and $SeO_y$ (where $0<y<2$).

When M is Al, the first metal oxide may be, for example, $Al_2O_3$, and the second metal oxide may be, for example, $Al_2O_y$ ($0<y<3$). The second metal oxide may be, for example, $Al_2O_{2.9}$, $Al_2O_{2.8}$, $Al_2O_{2.7}$, $Al_2O_{2.6}$, $Al_2O_{2.5}$, $Al_2O_{2.3}$, or $Al_2O_{2.1}$.

In the porous composite including the first metal oxide and/or the second metal oxide, the metal included in the metal oxide is chemically bonded to the graphene through a chemical bond. A carbon atom (C) of the graphene and a metal (M) of the metal oxide are, for example, chemically bonded through a C—O-M bond (e.g., a C—O—Si bond) with an oxygen atom as a medium. As the graphene and the metal of the metal oxide in the porous composite are chemically bonded through a chemical bond, the graphene and the metal oxide are complexed. Thus, this was distinguished from a simple physical mixture of graphene and a metal oxide.

An amount of the metal included in the porous composite may be about 0.01 atom % to about 10 atom %, about 0.01 atom % to about 7 atom %, about 0.1 atom % to about 5 atom %, about 0.1 atom % to about 3 atom %, or about 0.1 atom % to about 1 atom %, based on the total amount of the porous composite. An amount of the metal included in the porous composite may be determined by an XPS spectrum.

For example, as an amount of the metal in the porous composite is low, reduction in an initial efficiency by a reaction between a metal and lithium during charging and discharging may be prevented.

An average particle diameter of the first metal oxide and the second metal oxide may be measured using, for example, laser diffraction or dynamic light scattering. An average particle diameter of the silica and a reduction product of the silica $SiO_x$ ($0<x<2$) may be measured using, for example, a laser scattering particle size distribution measuring apparatus (e.g., a Horiba LA-920 particle size analyzer), and may be a median particle size (D50) value, for example, the particle size at 50% in a volume-based cumulative distribution of particle sizes. A uniformity deviation of at least one selected from the first metal oxide and the second metal oxide included in the composite may be 3% or less, 2% or less, or 1% or less. For example, the uniformity may be obtained from the XPS. Therefore, the at least one selected from the first metal oxide and the second metal oxide included in the composite may have a deviation of 3% or less, 2% or less, or 1% or less and may be uniformly distributed.

According to another embodiment, an anode includes an anode active material and the porous composite described above. The anode provides improved cycle characteristics by including the porous composite described above.

The anode active material may include, for example, at least one metal alloyable with lithium selected from silicon (Si), tin (Sn), aluminum (Al), germanium (Ge), lead (Pb), zinc (Zn), silver (Ag), and gold (Au), an alloy, an oxide, a nitride, an oxynitride, or a carbide of the at least one metal, or a composite of the at least one metal and a carbonaceous material. Examples of the carbonaceous material may include flake-type graphite, crystalline graphite, amorphous graphite, artificial graphite, carbonaceous mesophase spheres, cokes, carbon nanotubes, carbon nanofibers, graphene, or graphene oxides, but embodiments are not limited thereto, and any carbonaceous material available in the art may be used.

The anode active material may include at least one selected from silicon, a silicon alloy, a silicon nitride, a silicon oxynitride, a silicon carbide, and a silicon-carbon composite. For example, the silicon-carbon composite may be a silicon-carbon nanocomposite. The silicon-carbon nanocomposite refers to a composite in which at least one of silicon and carbon has a nano-scale size of less than 1 μm. For example, the silicon-carbon nanocomposite may be a composite in which silicon nanoparticles and carbon nanoparticles are complexed.

For example, the core may include composite particles of silicon and carbon and a carbonaceous coating layer disposed on a surface of the composite particles. The carbonaceous coating layer may include amorphous carbon. For example, carbon included in the coating layer may be a calcined product of a carbon precursor. The carbon precursor may be any material available in the art that may result a carbonaceous material by calcination. For example, the carbon precursor may be at least one selected from the group consisting of a polymer, coal tar pitch, petroleum pitch, meso-phase pitch, cokes, low-molecular-weight heavy oil, a coal-based pitch, and derivatives thereof. Due to formation of the carbonaceous coating layer on the core, a solid electrolyte interface (SEI) may be formed, and Li+ ions may selectively pass through the SEI, thereby preventing contact between silicon and an electrolytic solution. The amount of the coating layer may be about greater than 0 wt % to about 10 wt % based on the total weight of the core, and embodiments are not limited thereto. For example, the amount of the coating layer may be about 1 wt % to about 8 wt % based on the total weight of the core including the coating layer. For example, the amount of the coating layer may be about 1 wt % to about 6 wt % based on the total weight of the core including the coating layer. For example, the amount of the coating layer may be about 1 wt % to about 4 wt % based on the total weight of the core including the coating layer.

The anode active material may be, for example, a carbonaceous material. The carbonaceous material may be, for example, crystalline carbon, amorphous carbon, or a mixture thereof. Examples of the crystalline carbon may include graphite such as natural graphite or artificial graphite in amorphous, disk-shaped, flake, spherical, or fibrous form. Examples of the amorphous carbon may include soft carbon (carbon sintered at low temperature), hard carbon, mesophase pitch carbides, or sintered cokes.

The anode may be, for example, prepared according to the following example method, but embodiments are not limited thereto, and the method may be controlled according to the required conditions.

First, the porous composite, the anode active material, the binder, and the solvent are mixed to prepare an anode active material composition. The anode active material composition was directly coated and dried on a copper current collector to prepare an anode plate having an anode active material layer. In some embodiments, the anode active material composition may be cast on a separate support to form an anode active material film, which may then be separated from the support and laminated on the copper current collector to prepare an anode plate having an anode active material layer.

The anode current collector may generally have a thickness of about 3 μm to about 500 μm. Examples of a material for the anode current collector are not particularly limited as long as they do not cause a chemical change to a battery. For example, the material for the anode current collector may be a copper, stainless steel, aluminum, nickel, titanium, calcined carbon, copper or stainless steel that is surface-treated with carbon, nickel, titanium, or silver, and an aluminum-cadmium alloy. Also, like the cathode current collector, the anode current collector may have fine irregularities on a surface thereof to enhance adhesive strength to the anode active material. The anode current collector may be in various forms, such as a film, a sheet, a foil, a net, a porous structure, a foam structure, or a non-woven structure.

Examples of the binder may be a vinylidene fluoride/hexafluoropropylene copolymer, polyvinylidene fluoride (PVDF), polyacrylonitrile, polymethyl methacrylate, polytetrafluoroethylene (PTFE), mixtures thereof, and a styrene butadiene rubber polymer, polyvinyl alcohol, carboxymethyl cellulose (CMC), starch, hydroxypropyl cellulose, regenerated cellulose, polyethylene, polypropylene, ethylene-propylene-diene terpolymer (EPDM), sulfonated EPDM, and fluorine-based rubber, and examples of the solvent may be N-methylpyrrolidone (NMP), acetone, and water, but embodiments are not limited thereto, and any material available as a binder and/or a solvent in the art may be used.

A plasticizer or a pore forming agent may further be added to the anode active material composition to form pores inside the electrode plate.

The amounts of the anode active material, the binder, and the solvent may be in ranges that are commonly used in lithium batteries. At least one of the binder and the solvent may be omitted according to the use and the structure of the lithium battery.

The amount of the porous composite may be, for example, about 1 part to about 10 parts by weight, about 1 part to about 5 parts by weight, or about 1 part to about 3 parts by weight, based on 100 parts by weight of the anode active material.

The amount of the binder may be, for example, about 1 part to about 20 parts by weight based on 100 parts by weight of the anode active material.

The amount of the solvent may be, for example, about 1 part to about 50 parts by weight based on 100 parts by weight of the anode active material.

The anode may further include a conducting agent of the related art in addition to the porous composite. Examples of the conducting agent of the related art may be carbon black, graphite particulates, natural graphite, artificial graphite, acetylene black, or Ketjen black; carbon fibers; carbon nanotubes; a metal powder or metal fibers or metal tubes of copper, nickel, aluminum, or silver; or a conducting polymer such as a polyphenylene derivative, but embodiments are not limited thereto. Any material available as a conducting agent in the art may be used.

According to another embodiment, a lithium battery includes a cathode; an anode; and an electrolyte disposed between the cathode and the anode, and at least one of the cathode and the anode includes the porous composite.

The lithium battery may be prepared, for example, using the following method.

First, an anode is prepared according to the method of preparing an anode described above.

Next, the cathode active material, a conducting agent, a binder, and a solvent are mixed to prepare a cathode active material composition. The cathode active material composition is directly coated and dried on a metal current collector to prepare a cathode plate. In some embodiments, the cathode active material composition is cast on a separate support, and a film separated from the support is laminated on a metal current collector to prepare a cathode plate.

A part of or the whole conducting agent used in the cathode active material may be the porous composite.

The cathode active material may include at least one selected from a lithium cobalt oxide, a lithium nickel cobalt manganese oxide, a lithium nickel cobalt aluminum oxide, a lithium iron phosphate, and a lithium manganese oxide, but embodiments are not limited thereto, and any cathode active material available in the art may be used.

For example, the cathode active material may be at least one compound represented by any one of the following formulae: $Li_aA_{1-b}B'_bD'_2$ (where $0.90 \le a \le 1.8$, and $0 \le b \le 0.5$); $Li_aE_{1-b}B'O_{2-c}D'_c$ (where $0.90 \le a \le 1.8$, $0 \le b \le 0.5$, and $0 \le c \le 0.05$); $LiE_{2-b}B'_bO_{4-c}D'_c$ (where $0 \le b \le 0.5$, and $0 \le c \le 0.05$); $Li_aNi_{1-b-c}Co_bB'_cD'_\alpha$ (where $0.90 \le a \le 1.8$, $0 \le b \le 0.5$, $0 \le c \le 0.05$, and $0<\alpha<2$); $Li_aNi_{1-b-c}Co_bB'_cO_{2-\alpha}F'_\alpha$ (where $0.90 \le a \le 1.8$, $0 \le b \le 0.5$, $0 \le c \le 0.05$, and $0<\alpha<2$); $Li_aNi_{1-b-c}Co_bB'_cO_{2-\alpha}F'_2$ (where $0.90 \le a \le 1.8$, $0 \le b \le 0.5$, $0 \le c \le 0.05$, and $0<\alpha<2$); $Li_aNi_{1-b-c}Mn_bB'_cD'_\alpha$ (where $0.90 \le a \le 1.8$, $0 \le b \le 0.5$, $0 \le c \le 0.05$, and $0<\alpha \le 2$); $Li_aNi_{1-b-c}Mn_bB'_cO_{2-\alpha}F'_\alpha$ (where $0.90 \le a \le 1.8$, $0 \le b \le 0.5$, $0 \le c \le 0.05$, and $0<\alpha<2$); $Li_aNi_{1-b-c}Mn_bB'_cO_{2-\alpha}F'_2$ (where $0.90 \le a \le 1.8$, $0 \le b \le 0.5$, $0 \le c \le 0.05$, and $0<\alpha<2$); $Li_aNi_bE_cG_dO_2$ (where $0.90 \le a \le 1.8$, $0 \le b \le 0.9$, $0 \le c \le 0.5$, and $0.001 \le d \le 0.1$); $Li_aNi_bCo_cMn_dGeO_2$ (where $0.90 \le a \le 1.8$, $0 \le b \le 0.9$, $0 \le c \le 0.5$, $0 \le d \le 0.5$, and $0.001 \le e \le 0.1$); $Li_aNiG_bO_2$ (where $0.90 \le a \le 1.8$, and $0.001 \le b \le 0.1$); $Li_aCoG_bO_2$ (where $0.90 \le a \le 1.8$, and $0.001 \le b \le 0.1$); $Li_aMnG_bO_2$ (where $0.90 \le a \le 1.8$, and $0.001 \le b \le 0.1$); $Li_aMn_2G_bO_4$ (where $0.90 \le a \le 1.8$, and $0.001 \le b \le 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \le f \le 2$); $Li_{(3-f)}Fe_2(PO_4)_3$ (where $0 \le f \le 2$); and $LiFePO_4$.

In the compound, A may be nickel (Ni), cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D' may be oxygen (O), fluorine (F), sulfur (S), phosphorus (P), or a combination thereof; E may be cobalt (Co), manganese (Mn), or a combination thereof; F' may be fluorine (F), sulfur (S), phosphorus (P), or a combination thereof; G may be (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; I' may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof.

The compounds may have a surface coating layer (hereinafter, also referred to as "coating layer"). Alternatively, a mixture of a compound without a coating layer and a compound having a coating layer, the compounds being selected from the compounds listed above, may be used. In some embodiments, the coating layer may include at least one compound of a coating element selected from oxide, hydroxide, oxyhydroxide, oxycarbonate, and hydroxycarbonate of the coating element. In some embodiments, the compounds for the coating layer may be amorphous or crystalline. In some embodiments, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. In some embodiments, the coating layer may be formed using any method that does not adversely affect the physical properties of the cathode active material when a compound of the coating element is used. For example, the coating layer may be formed using a spray coating method or a dipping method. The coating methods may be well understood by one of ordinary skill in the art, and thus a detailed description thereof will be omitted.

In some embodiments, the cathode active material may be $LiNiO_2$, $LiCoO_2$, $LiMn_xO_{2x}$ (where x is 1 or 2), $LiNi_{1-x}Mn_xO_2$ (where $0<x<1$), $LiNi_{1-x-y}Co_xMn_yO_2$ (where $0 \le x \le 0.5$, and $0 \le y \le 0.5$), $LiNi_{1-x-y}Co_xAl_yO_2$ (where $0 \le x \le 0.5$, and $0 \le y \le 0.5$), $LiFeO_2$, $V_2O_5$, TiS, or MoS.

In some embodiments, the conducting agent, the binder, and the solvent used for the cathode active material composition may be the same as those used for the anode active material composition. In some embodiments, a plasticizer may be further added to the cathode active material composition and/or to the anode active material composition to form pores in a corresponding electrode plate.

The amounts of the cathode active material, the conducting agent, the binder, and the solvent may be in ranges that are commonly used in lithium batteries. At least one of the conducting agent, the binder, and the solvent may be omitted according to the use and the structure of the lithium battery.

Next, a separator to be inserted between the cathode and the anode is prepared. The separator for the lithium battery may be any separator that is commonly used in lithium batteries. The separator may have low resistance to migration of ions in an electrolyte and have an excellent electrolyte-retaining ability. For example, the separator may be selected from glass fibers, polyester, Teflon, polyethylene, polypropylene, polytetrafluoroethylene (PTFE), or a combination thereof, which may have a non-woven form or a woven form. For example, a rollable separator such as polyethylene or polypropylene may be used for a lithium ion battery, and a separator with a good organic electrolytic solution-retaining ability may be used for a lithium ion polymer battery. For example, the separator may be manufactured in the following manner.

In some embodiments, a polymer resin, a filler, and a solvent may be mixed together to prepare a separator composition. Then, the separator composition may be directly coated on an electrode, and then dried to form the separator. In some embodiments, the separator composition may be cast on a support and then dried to form a separator film, which may then be separated from the support and laminated on an electrode to form the separator.

The polymer resin used to manufacture the separator may be any material that is used as a binder for electrode plates. Examples of the polymer resin may be a vinylidenefluoride/hexafluoropropylene copolymer, polyvinylidene fluoride (PVDF), polyacrylonitrile, polymethylmethacrylate, and a mixture thereof.

Next, an electrolyte is prepared.

For example, the electrolyte may be an organic electrolyte solution. In some embodiments, the electrolyte may be in a solid phase. Examples of the electrolyte may be boron oxide and lithium oxynitride, but embodiments are not limited thereto, and any material available as a solid electrolyte in the art may be used. In some embodiments, the solid electrolyte may be formed on the anode by, for example, sputtering.

For example, an organic electrolyte solution may be prepared. The organic electrolyte solution may be prepared by dissolving a lithium salt in an organic solvent.

The organic solvent may be any solvent available as an organic solvent in the art. In some embodiments, the organic solvent may be propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethyl formamide, dimethyl acetamide, dimethylsulfoxide, dioxane, 1,2-dimethoxyethane, sulfolane, dichloroethane, chlorobenzene, nitrobenzene, diethylene glycol, dimethyl ether, or a mixture thereof.

In some embodiments, the lithium salt may be any material available as a lithium salt in the art. In some embodiments, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are each independently a natural number), LiCl, LiI, or a mixture thereof.

Figure 4:
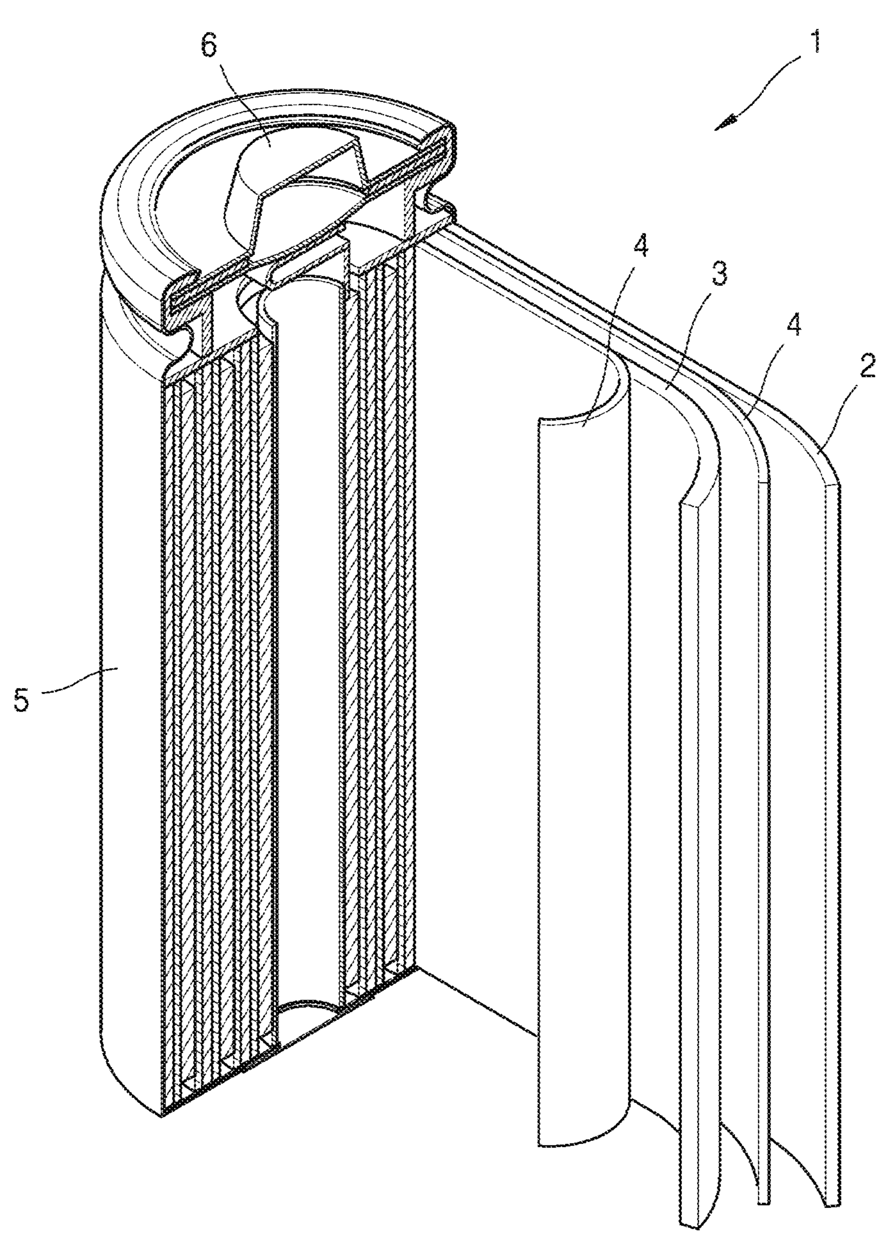
FIG. 4 is a schematic view of a lithium battery according to an embodiment.

As shown in FIG. 4, a lithium battery 1 includes a cathode 3, an anode 2, and a separator 4. In some embodiments, the cathode 3, the anode 2, and the separator 4 may be wound or folded, and then sealed in a battery case 5. In some embodiments, the battery case 5 may be filled with an organic electrolytic solution and sealed with a cap assembly 6, thereby completing the manufacture of the lithium battery 1. In some embodiments, the battery case 5 may be a cylindrical type, a rectangular type, or a thin-film type. For example, the lithium battery 1 may be a thin-film type battery. In some embodiments, the lithium battery 1 may be a lithium ion battery.

In some embodiments, the separator 4 may be disposed between the cathode 3 and the anode 2 to form a battery assembly. In some embodiments, the battery assembly may be stacked in a bi-cell structure and impregnated with the electrolytic solution, and the resultant assembly may be put into a pouch and hermetically sealed, thereby completing the manufacture of a lithium ion polymer battery.

In some embodiments, a plurality of battery assemblies may be stacked to form a battery pack, which may be used in any device that requires high capacity and high output, for example, in a laptop computer, a smart phone, or an electric vehicle.

The lithium battery may have improved lifespan characteristics and high-rate characteristics, and thus may be used in an electric vehicle (EV), for example, in a hybrid vehicle such as a plug-in hybrid electric vehicle (PHEV).

According to another embodiment, a method of preparing a porous composite includes preparing a composite precursor including at least one selected from silica or a first metal oxide and $SiO_x$ (where $0<x<2$) or a second metal oxide by supplying and heat-treating a reaction gas formed in the form of a carbon source gas to the silica or the first metal oxide; and preparing a porous composite by removing at least one selected from the silica or the first metal oxide and $SiO_x$ (where $0<x<2$) or a second metal oxide from the composite precursor.

The preparing of the composite precursor may include, for example, supplying a reaction gas formed of a carbon source gas to a structure including a metal oxide and heat-treating the structure including a metal oxide.

The preparing of the porous composite may include, for example, a reaction gas formed of a carbon source gas to of at least one of silica and/or a first metal oxide represented by $M_aO_c$ (where $0<a\leq3$, $0<c<4$, when a is 1, 2, or 3, c is an integer) and heat-treating the at least one of silica and/or a first metal oxide represented by $M_aO_c$ (where $0<a\leq3$, $0<c<4$, when a is 1, 2, or 3, c is an integer), wherein M is at least one metal selected from Groups 2 to 13, 15, and 16 of the periodic table.

The carbon source gas may be a compound represented by Formula 1, or a mixed gas of a compound represented by Formula 1 and at least one selected from a compound represented by Formula 2 and an oxygen-containing gas represented by Formula 3.

$$CnH_{(2n+2-a)}[OH]_a \quad \text{Formula 1}$$

In Formula 1, n is 1 to 20, a is 0 or 1;

$$CnH_{2n} \quad \text{Formula 2}$$

In Formula 2, n is 2 to 6;

$$C_xH_yO_z \quad \text{Formula 3}$$

In Formula 3, x is an integer of 0 or 1 to 20, y is an integer of 0 or 1 to 20, and z is an integer of 1 or 2.

The compound represented by Formula 1 or the compound represented by Formula 2 may be at least one selected from methane, ethylene, propylene, methanol, ethanol, and propanol. The oxygen-containing gas represented by Formula 3 may include, for example, at least one selected from carbon dioxide ($CO_2$), carbon monoxide (CO), water vapor ($H_2O$), or a mixture thereof.

The method may further include cooling with at least one inert gas selected from the group consisting of nitrogen, helium, and argon after the supplying a reaction gas formed of a carbon source gas to silica and/or a first metal oxide represented by $M_aO_c$ (where $0<a\leq3$, $0<c\leq4$, when a is 1, 2, or 3, c is an integer) and heat-treating the resultant. The cooling refers to controlling the temperature to room temperature (about 20° C. to about 25° C.). The carbon source gas may include at least one inert gas selected from the group consisting of nitrogen, helium, and argon.

The oxygen-containing gas may be at least one selected from carbon monoxide, carbon dioxide, and water vapor.

According to a first condition, for example, first, methane is supplied to a reactor provided with silica and/or the first metal oxide represented by $M_aO_c$ (where 0<a≤3, 0<c≤4, when a is 1, 2, or 3, c is an integer), and is heated to heat-treatment temperature (T). The heating time up to heat-treatment temperature (T) is about 10 minutes to about 4 hours, and the heat-treatment temperature (T) is about 700° C. to about 1100° C. For example, the heat-treatment may be performed for a reaction time. The reaction time may be, for example, about 4 hours to about 8 hours. The resultant product of the heat-treatment is cooled to room-temperature to prepare a composite. A time for a process of the cooling from the heat-treatment temperature (T) to room-temperature may be, for example, about 1 hour to about 5 hours.

According to a second condition, for example, first, hydrogen is supplied to a reactor provided with silica and/or the first metal oxide represented by $M_aO_c$ (where 0<a≤3, 0<c≤4, when a is 1, 2, or 3, c is an integer), and is heated to heat-treatment temperature (T). For example, the heating time up to heat treatment temperature (T) is about 10 minutes to about 4 hours, and the heat treatment temperature (T) is about 700° C. to about 1100° C. After the heat-treatment is performed at the heat-treatment temperature (T) for a set or predetermined reaction time, methane gas is supplied, and heat-treatment is performed for residual reaction time. The reaction time may be, for example, about 4 hours to about 8 hours. The resultant product of the heat-treatment is cooled to room-temperature to prepare a composite. For example, nitrogen is supplied during the process of cooling the resultant product. The time taken to perform the process of cooling the resultant product from the heat-treatment temperature (T) to room-temperature is, for example, about 1 hour to 5 hours.

According to a third condition, for example, first, hydrogen is supplied to a reactor provided with silica and/or the first metal oxide represented by $M_aO_c$ (where 0<a≤3, 0<c≤4, when a is 1, 2, or 3, c is an integer), and is heated to heat-treatment temperature (T). For example, the heating time up to heat treatment temperature (T) is about 10 minutes to about 4 hours, and the heat treatment temperature (T) is about 700° C. to about 1100° C. After the heat-treatment is performed at the heat-treatment temperature (T) for a set or predetermined reaction time, a mixed gas of methane and hydrogen is supplied, and heat-treatment is performed for residual reaction time. The reaction time may be, for example, about 4 hours to about 8 hours. The resultant product of the heat-treatment is cooled to room-temperature to prepare a composite. For example, nitrogen is supplied during the process of cooling the resultant product. A time for a process of the cooling from the heat-treatment temperature (T) to room-temperature may be, for example, about 1 hour to about 5 hours.

In the process of preparing the composite precursor, when the carbon source gas includes water vapor, a composite precursor having very excellent (or improved) conductivity may be obtained. The content of water vapor in the mixed gas is not limited, and is, for example, about 0.01 vol % to about 10 vol % based on 100 vol % of the total carbon source gas. The carbon source gas may be, for example, methane; a mixed gas containing methane and an inert gas; or a mixed gas containing methane and an oxygen-containing gas.

The carbon source gas may be, for example, methane; a mixed gas of methane and carbon dioxide; or a mixed gas of methane, carbon dioxide and water vapor. The molar ratio of methane and carbon dioxide in the mixed gas of methane and carbon dioxide is about 1:0.20 to about 1:0.50, about 1:0.25 to about 1:0.45, or about 1:0.30 to about 1:0.40. The molar ratio of methane and carbon dioxide and water vapor in the mixed gas of methane and carbon dioxide and water vapor is about 1:0.20 to 0.50:0.01 to 1.45, about 1:0.25 to 0.45:0.10 to 1.35, or about 1:0.30 to 0.40:0.50 to 1.0.

The carbon source gas is, for example, carbon monoxide and/or carbon dioxide. The carbon source gas is, for example, a mixed gas of methane and nitrogen. The molar ratio of methane and nitrogen in the mixed gas of methane and nitrogen is about 1:0.20 to about 1:0.50, about 1:0.25 to about 1:0.45, or about 1:0.30 to about 1:0.40. In one or more embodiments, the carbon source gas may not include an inert gas such as nitrogen.

The heat-treatment pressure may be selected in consideration of the heat-treatment temperature, the composition of the gas mixture, and the desired coating amount of carbon. The heat-treatment pressure may be controlled by adjusting the amount of the inflowing mixed gas and the amount of the outflowing gas mixture. The heat-treatment pressure is, for example, about 0.5 atm or more, about 1 atm or more, about 2 atm or more, about 3 atm or more, about 4 atm or more, or about 5 atm or more.

The heat-treatment time may be selected in consideration of the heat-treatment temperature, the heat-treatment pressure, the composition of the gas mixture, and the desired coating amount of carbon. For example, the reaction time at the heat-treatment temperature is, for example, about 10 minutes to about 100 hours, about 30 minutes to about 90 hours, or about 50 minutes to about 40 hours. For example, as the heat-treatment time increases, the amount of graphene (e.g., carbon) deposited increases, and thus, the electrical properties of the composite may be improved. However, the increase in the amount of deposited carbon may not necessarily be proportional to time. For example, after a set or predetermined period of time, the deposition of graphene may no longer occur, or the deposition rate of graphene may be lowered.

At least one selected from silica ($SiO_2$) and/or a first metal oxide represented by $M_aO_c$ (0<a≤3, 0<c≤4, when a is 1, 2, or 3, c is an integer) and a reduction product thereof, which is $SiO_x$ (0<x<2) and/or a second metal oxide represented by $M_aO_b$ (0<a≤3, 0<b<4, when a is 1, 2, or 3, b is not an integer) is subjected to uniform graphene coating to obtain a composite precursor.

Figure 3:
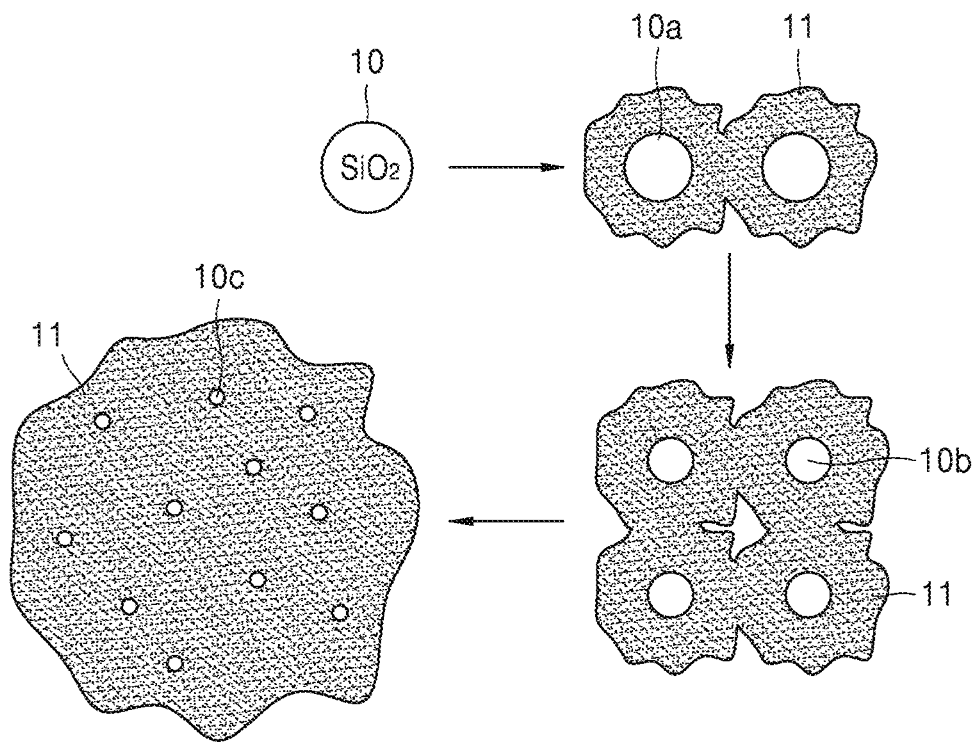
FIG. 3 is a schematic view of a process of forming a porous composite according to an embodiment.

FIG. 3 illustrates a process of forming the composite precursor according to an embodiment. However, embodiments of the present disclosure are not limited to the scheme shown in FIG. 3, which is merely presented as an example.

Referring to FIG. 3, a reaction gas including a carbon source gas is supplied on a silica particle 10, and thus graphene 11 may be grown on at least one selected from a silica particle and a reduction product of the silica particle 10*a*. The graphene 11 may also be gradually grown on at least one selected from silica and a reduction product of the silica, $SiO_x$ (where 0<x<2) 10*b*, resulting from the lapse of reaction time to thus obtain a composite precursor.

For example, the composite precursor may have a structure in which at least one selected from a silica particle and a reduction product of the silica particle 10*c* is distributed in the graphene 11. At least one selected from a silica particle and a reduction product of the silica particle 10*c* may be distributed in the graphene 11.

In FIG. 3, the silica particle 10, the at least one selected from a silica particle and a reduction product of the silica particle 10*a*, and the at least one selected from a silica particle and a reduction product of the silica particle 10*c* are shown to have different sizes, but are not limited thereto. Although not illustrated in detail, the graphene 11 in FIG. 3 may have a structure of layer or nanosheet, or a structure including flakes.

As used herein, the terms "nanosheet" and "layer" may be defined as follows. The term "nanosheet" may refer to graphene formed in an irregular pattern on the at least one selected from a silica particle and a reduction product of the silica particle. The term "layer" may refer to graphene formed as a continuous uniform pattern on the at least one selected from a silica particle and a reduction product of the silica particle. The term "flake" may refer to the case where the nanosheet or layer is partially damaged or deformed.

The composite precursor includes a graphene matrix having at least one structure selected from a hemispherical structure, a spherical structure, a spiral structure in which hemispherical structures or spherical structures are connected to each other, and a cluster structure in which hemispherical structures or spherical structures are aggregated with each other, and a sponge structure; and at least one selected from the first metal oxide represented by $M_aO_b$ ($0<a\leq3$, $0<b\leq4$, when a is 1, 2, or 3, and b is an integer) and the second metal oxide represented by $M_aO_c$ ($0<a\leq3$, $0<c<4$, when a is 1, 2, or 3, c is not an integer) disposed on the graphene matrix.

Next, the at least one selected from the first metal oxide and the second metal oxide is removed from the composite precursor to prepare a porous composite.

The preparing of the porous composite may be performed by, for example, dry etching or set etching. The dry etching may be performed by plasma etching, but embodiments are not limited thereto, and any method available in the art may be used. The wet etching may be performed by an acid or a base. For example, after adding and stirring a porous composite to an acidic solution or a basic solution, the first metal oxide and/or the second metal oxide may be removed by being dissolved due to the acid or base. Examples of the acid may be chloric acid, sulfuric acid, and nitric acid, but embodiments are not limited thereto.

The preparing of the porous composite may include, for example, adding and stirring the composite precursor to a basic solution. The basic solution may be prepared by adding a base in distilled water. The base may be, for example, LiOH, but embodiments are not limited thereto. The solvent may be distilled water, but embodiments are not limited thereto, and alcohol or acetonitrile may be used as the solvent.

A time for the adding and stirring the composite precursor to the basic solution may be, for example, about 5 hours to about 200 hours, about 10 hours to about 200 hours, about 50 hours to about 200 hours, or about 80 hours to about 100 hours, but embodiments are not limited thereto.

A concentration of the acid or base in the acidic solution or basic solution may be, for example, about 0.1 wt % to about 10 wt % or about 1 wt % to about 5 wt %, but embodiments are not limited thereto.

The composite precursor is added to the acidic or basic solution, stirred, and filtered to separate the residue, washed several times with distilled water to completely remove the acid or base, and then dried to obtain a porous composite.

The first metal oxide and/or the second metal oxide may be completely removed or some may remain depending on etching conditions such as the concentration of the acidic solution or the basic solution and the stirring time.

For example, as the silica particle 10*a*, the at least one selected from a silica particle and a reduction product of the silica particle 10*a*, and the at least one selected from silica and a reduction product of the silica 10*c* are partially or completely removed by etching in the composite precursor of FIG. 3, a porous composite having nanopores arranged in place of the silica particles may be obtained.

Mode of Disclosure

The present disclosure will now be described in more detail with reference to the following examples. However, these examples are not intended to limit the scope of the present disclosure.

(Preparation of Graphene Silica Composite)

Preparation Example 1: Graphene Silica Composite

After locating a silica ($SiO_2$) particle (average particle diameter: about 15 nm, available from OCI) in a reactor, an inner temperature of the reactor was increased to 1000° C. under the condition of supplying $CH_4$ at about 300 sccm and 1 atm for about 30 minutes.

Next, the temperature was maintained for 7 hours to perform heat-treatment. Then, the inner temperature of the reactor was controlled to room temperature (20° C. to 25° C.) to obtain a composite (a composite precursor) in which a silica particle and a $SiO_x$ ($0<x<2$) particle, which was a reduction product of silica, were embedded in graphene.

(Preparation of Silicon-Carbon Composite Anode Active Material)

Preparation Example 2: Preparation of Silicon-Carbon Composite 25 parts by weight of plate-shaped and needle-shaped Si particles, 10 parts by weight of stearic acid, 65 parts by weight of isopropyl alcohol were mixed to prepare a composition, the composition was spray-dried, and the resultant was dried to obtain precursor secondary particles having an average particle diameter of about 4.5 μm. A silicon suboxide ($SiO_x$) ($0<x<2$) having a thickness of about 0.1 nm to about 10 nm was formed on a surface of silicon.

The spray-drying was performed using a spray dryer (Model: MMSD Micro Mist Spray Dryers, Fujisaki electric). The spray nozzle size and pressure were controlled under a nitrogen atmosphere and the isopropyl alcohol was dried by adjusting the powder spraying atmosphere temperature to about 200° C. to prepare precursor secondary particles.

The precursor secondary particles were placed in a reactor, and a mixed gas having a volume ratio of $CH_4$:$CO_2$=80:20 was supplied into the reactor under the supplying conditions of about 300 sccm at 1 atm for about 30 minutes, and the temperature inside the reactor was increased to 1000° C.

Next, the precursor secondary particles were heat-treated by maintaining the temperature for 4 hours. Then, the temperature inside the reactor was controlled to room temperature (20° C. to 25° C.) to obtain a porous silicon-carbon composite powder.

(Preparation of Porous Composite)

Example 1: Porous Composite 1

The graphene silica composite prepared in Preparation Example 1 was added to a 3.2 wt % LiOH aqueous solution and stirred for 88 hours, and the residue was filtered with a centrifuge.

The filtered residue was washed several times with distilled water to completely remove the base and dried to obtain a porous composite. A size of nanopores in the porous composite was about 10 nm to about 20 nm.

Example 2: Porous Composite 2

A porous composite was prepared in the same manner as in Example 1, except that the stirring time was changed to 6 hours.

(Preparation of Lithium Battery (Half-Cell)—Carbonaceous Anode)

Example 3: Carbonaceous Anode, Porous Composite 1

(Preparation of Carbonaceous Anode)

Natural graphite particles (available from Mitsubishi Chemical Co.), a powder of the porous composite 1 prepared in Example 1, styrene butadiene rubber (SBR), and carboxymethyl cellulose (CMC) were mixed at a weight ratio of 96:1:1.5:1.5, distilled water was added thereto, and stirred using a mechanical stirrer for 60 minutes to prepare an anode active material slurry. The anode active material slurry was applied on a copper current collector having a thickness of 15 μm to a thickness of about 60 μm using a doctor blade, dried at room temperature, dried in a hot-air dryer of 100° C. for about 0.5 hours, and then dried again in a vacuum condition of 120° C. for about 4 hours to prepare an anode plate. The anode plate was roll-pressed to prepare an anode.

(Preparation of Coin Cell)

The anode thus prepared, a lithium metal as a counter electrode, a polypropylene separation film (Cellguard3510), and an electrolyte solution prepared by adding 1.15 M $LiPF_6$ as a lithium salt to a mixture solution of ethylene carbonate (EC)+ethylmethylcarbonate (EMC)+dimethyl carbonate (DMC) (at a volume ratio of 2:4:4) were used to prepare a coin cell.

Example 4: Carbonaceous Anode, Porous Composite 2

A coin cell was prepared in the same manner as in Example 3, except that a powder of the porous composite 2 prepared in Example 2 was used instead of the powder of the porous composite 1 prepared in Example 1.

Comparative Example 1: Grapnene-Silica

An anode and a coin cell were prepared in the same manner as in Example 3, except that the graphene-silica composite powder prepared in Preparation Example 1 was used instead of the porous composite powder prepared in Example 1.

Comparative Example 2: Ketjen Black

An anode and a coin cell were prepared in the same manner as in Example 3, except that ketjen black (EC600JD, available from Lion) was used instead of the powder of the porous composite prepared in Example 1.

(Preparation of Lithium Battery (Half-Cell)—Silicon-Carbon Composite Anode)

Example 5: Silicon-Carbon Composite Anode, Porous Composite 1

(Preparation of Silicon-Carbon Composite Anode)

The silicon-carbon composite powder prepared in Preparation Example 2, artificial graphite particles (a particle diameter of about 12 μm, available from Shanshan Technology), the powder of the porous composite 1 prepared in Example 1, and polyvinyl alcohol (PVA, available from Aldrich) as a binder were mixed at a weight ratio of 18.5:76.5:1:4, distilled water was added thereto, and the resultant was stirred using a mechanical stirrer for 60 minutes to prepare an anode active material slurry. The anode active material slurry was applied on a copper current collector having a thickness of 15 μm to a thickness of about 60 μm using a doctor blade, dried at room temperature, dried in a hot-air dryer of 100° C. for about 0.5 hours, and then dried again in a vacuum condition of 120° C. for about 4 hours to prepare an anode plate. The anode plate was roll-pressed to prepare an anode.

(Preparation of Coin Cell)

The anode thus prepared, a lithium metal as a counter electrode, a polypropylene separation film (Cellguard3510), and an electrolyte solution prepared by adding 1.0 M $LiPF_6$ as a lithium salt to a mixture solution of ethylene carbonate (EC)+diethyl carbonate (DEC)+fluoroethylene carbonate (FEC) (at a volume ratio of 5:70:25) were used to prepare a coin cell.

Example 6: Silicon-Carbon Composite Anode, Porous Composite 1

An anode and a coin cell were prepare in the same manner as in Example 5, except that an amount of the powder of the porous composite prepared in Example 1 was changed to 0.5.

Comparative Example 3: Silicon-Carbon Composite Anode, Ketjen Black

An anode and a coin cell were prepared in the same manner as in Example 5, except that ketjen black (EC600JD, available from Lion) was used instead of the powder of the porous composite prepared in Example 1.

Evaluation Example 1: X-Ray Photoelectron Spectroscopy (XPS) Spectrum Evaluation XPS spectra of the porous composite prepared in Example 1, the porous composite prepared in Example 2, and the graphene-silica composite prepared in Preparation Example 1 were measured using Quantum 2000 (Physical Electronics).

Figure 2A:
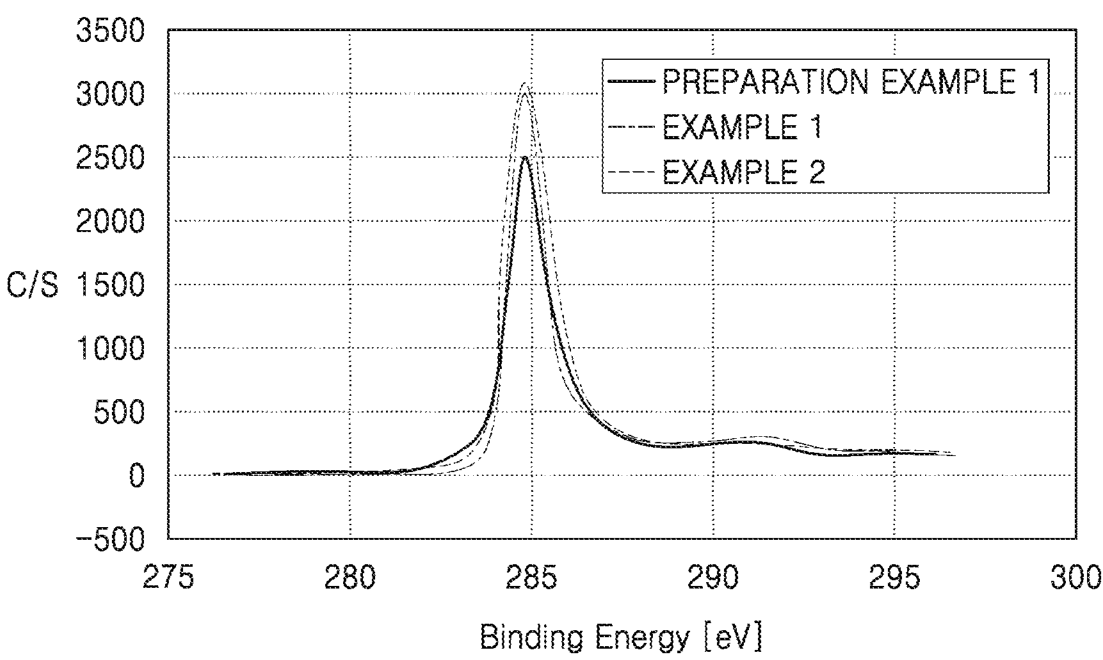
FIG. 2A is an X-ray photoelectron spectroscopy (XPS) image of a C 1s orbital of the composites prepared in Examples 1 and 2 and Comparative Example 1.
Figure 2B:
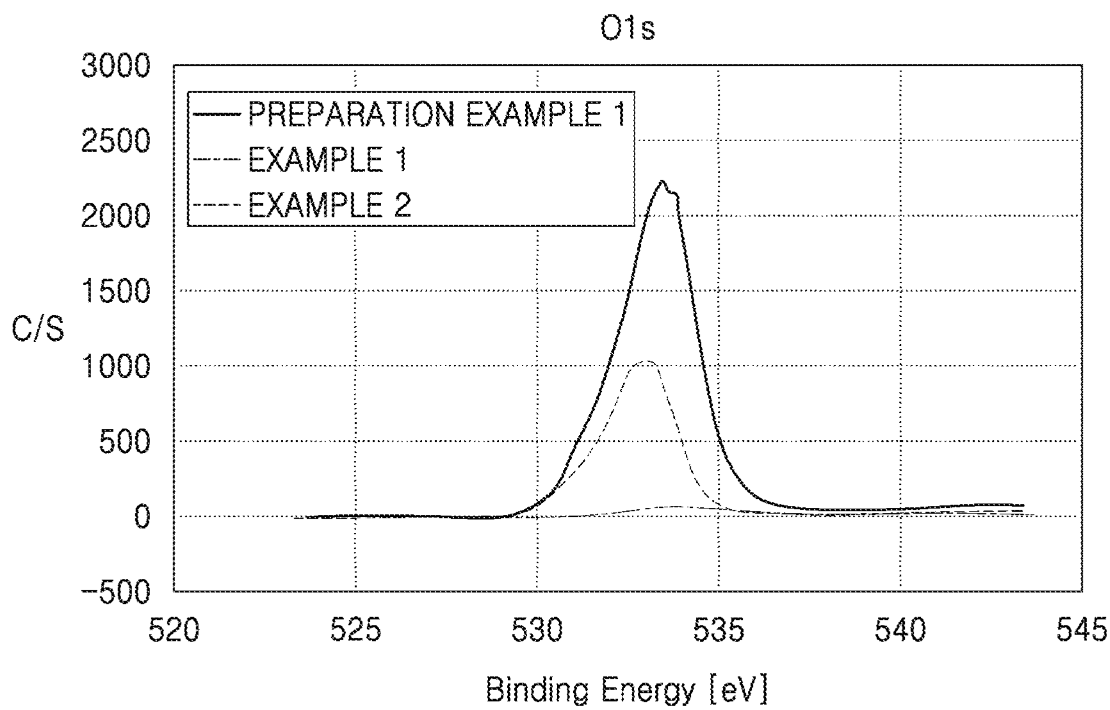
FIG. 2B is an XPS image of an O 1s orbital of the composites prepared in Examples 1 and 2 and Comparative Example 1.
Figure 2C:
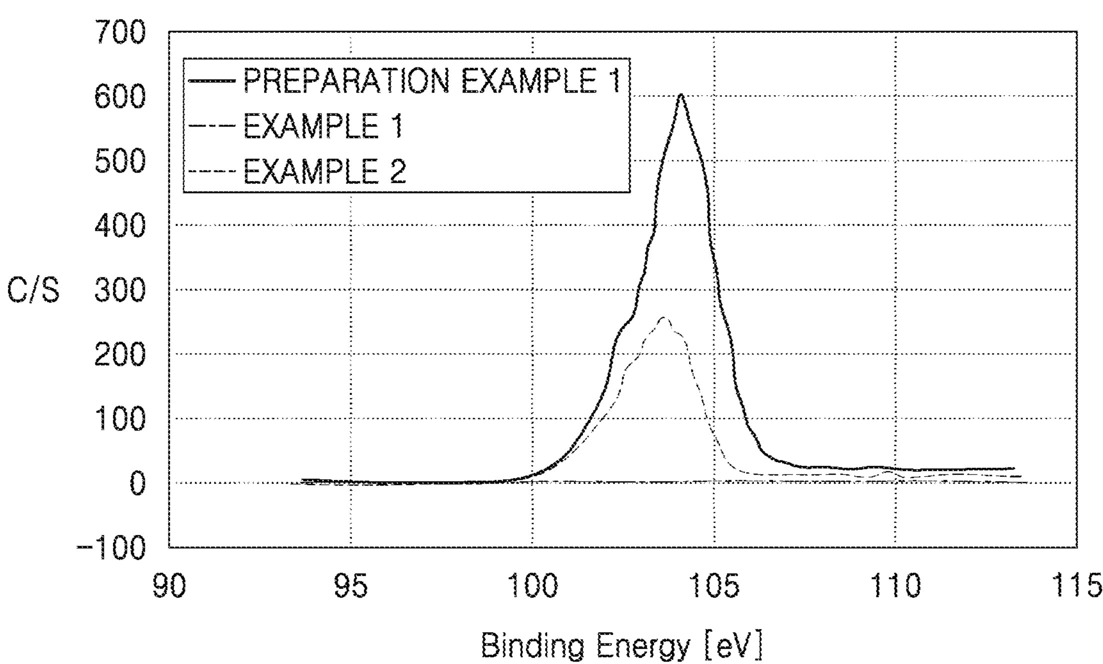
FIG. 2C is an XPS image of a Si 2p orbital of the composites prepared in Examples 1 and 2 and Comparative Example 1.

FIG. 2A shows a peak of C 1s orbital, FIG. 2B shows a peak of O 1s orbital, and FIG. 2C shows a peak of Si 2p orbital.

As shown in FIG. 2A, the intensities of the carbon peak in the composites of Examples 1 and 2 and Comparative Example 1 all resulted high.

As shown in FIG. 2B, the oxygen peak of the porous composite of Example 2 significantly decreased, and the oxygen peak of the porous composite of Example 1 was insignificant, as compared to the oxygen peak of the composite of Comparative Example 1.

As shown in FIG. 2C, the silicon peak of the porous composite of Example 2 significantly decreased, and there was almost no silicon peak of the porous composite of Example 1, as compared to the silicon peak of the composite of Comparative Example 1.

The amounts of silicon, oxygen, and carbon calculated from the peak areas are shown in Table 1.

TABLE 1

| | Amount of C [at %] | Amount of O [at %] | Amount of Si [at %] |
|---|---|---|---|
| Example 1 (88 hrs of etching) | 98.12 | 1.44 | 0.44 |
| Example 1 (6 hrs of etching) | 74.98 | 16.61 | 8.4 |
| Preparation Example 1 (no etching) | 52.08 | 32.18 | 15.74 |

As shown in Table 1 and FIGS. 2A to 2C, the porous composite of Example 1 had a Si amount that was insignificant as lower than 0.5 at %, most of silica ($SiO_2$) particles and $SiO_x$ (where $0<x<2$) were removed by etching, and nanopores were formed. In the porous composite of Example 2, about half of silica ($SiO_2$) particles and $SiO_x$ (where $0<x<2$) were removed by etching, and nanopores were formed.

Evaluation Example 2: High-Resolution Transmission Electronic Microscope (HR-TEM) Analysis High-resolution transmission electronic microscope (HR-TEM, Tecnai Titan available from FEI) analysis was performed on the composite prepared in Example 1.

Figure 1D:
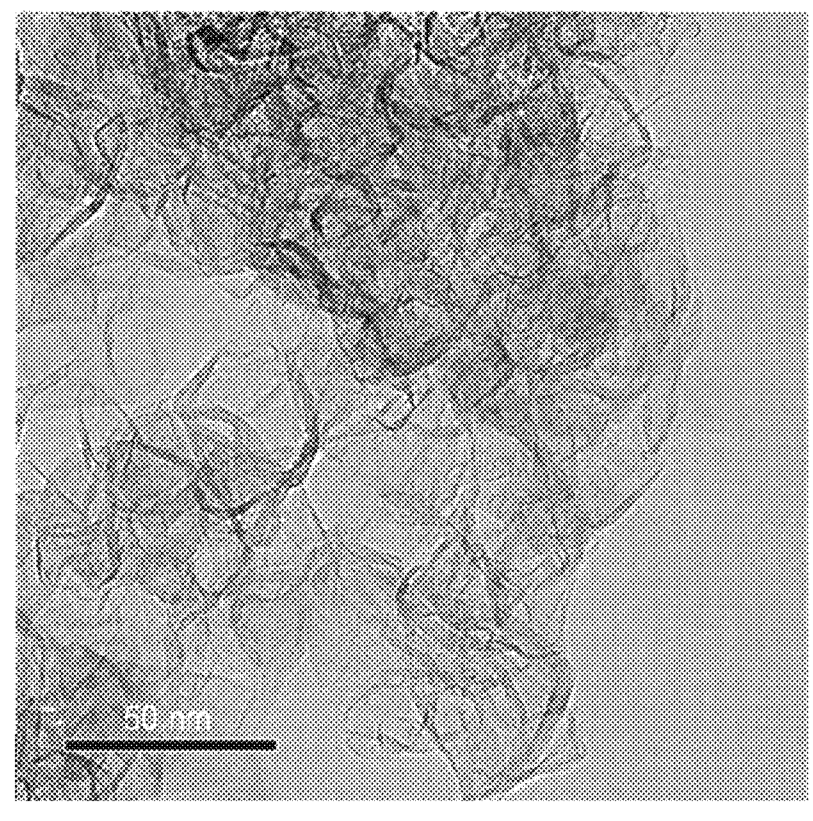
Figure 1E:
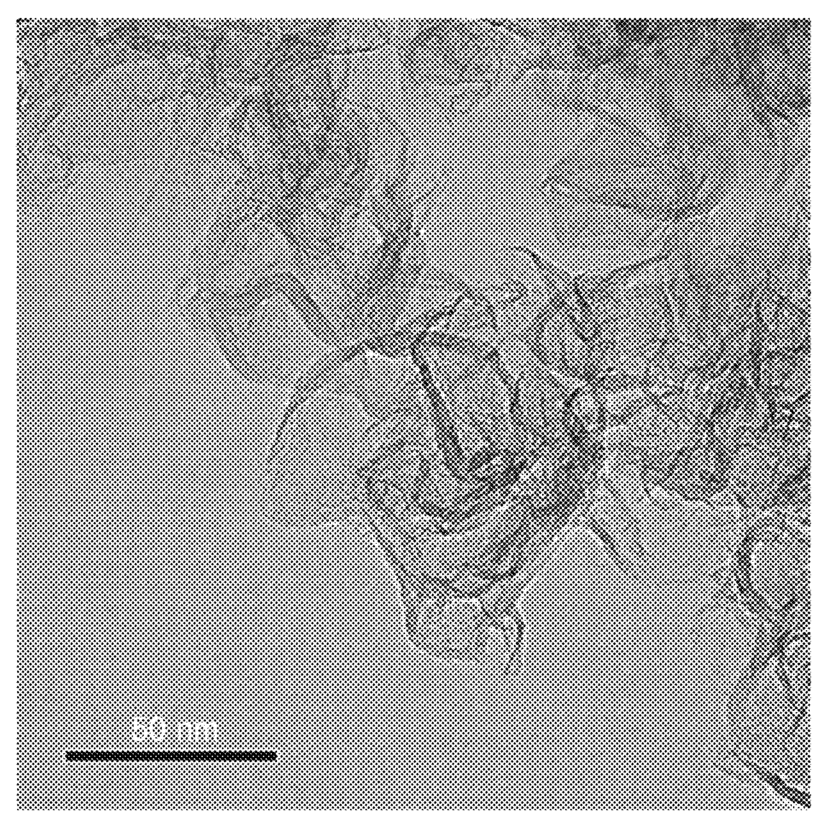

FIG. 1A shows an image of a graphene-silica composite before etching, and FIGS. 1B to 1E are images of the porous composite after etching.

As shown in FIG. 1A, the graphene-silica composite prepared in Example 1 had a structure in which a silica ($SiO_2$) particle and a $SiO_x$ ($0<x<2$) particle, which is a reduction product of silica, were embedded in graphene. It was confirmed that a graphene layer is disposed on the outer surface of at least one of the silica ($SiO_2$) particle and $SiO_x$ ($0<x<2$) particle. The at least one of the silica ($SiO_2$) particle and $SiO_x$ ($0<x<2$) particle was uniformly dispersed in a graphene matrix. A particle diameter of the at least one of the silica ($SiO_2$) particle and $SiO_x$ ($0<x<2$) particle was about 15 nm. A particle diameter of the graphene-silica composite prepared in Example 1 was about 100 nm to about 200 nm. In FIG. 1A, the arrow indicates at least one of the silica ($SiO_2$) particle and $SiO_x$ ($0<x<2$) particle.

As shown in FIGS. 1B to 1E, the silica ($SiO_2$) particle and $SiO_x$ ($0<x<2$) particle were almost not observed in the porous composite prepared by etching in Example 1, and the porous composite had a structure having nanopores arranged in the graphene matrix. It was confirmed that a graphene layer was disposed on the outside of the nanopores. The nanopores were uniformly dispersed in the graphene matrix. The nanopores arranged in the graphene matrix were formed as the silica ($SiO_2$) particle and $SiO_x$ ($0<x<2$) particle were removed by etching. A particle diameter of the nanopores was about 15 nm. A particle diameter of the porous composite was about 100 nm to about 200 nm.

Evaluation Example 3: Evaluation of Room-Temperature Charge/Discharge Characteristics, Carbonaceous Anode Active Material Lithium batteries prepared in Example 3 and Comparative Examples 1 and 2 were charged at about 25° C. with a constant current of 0.1 C rate until a voltage reached 0.01 V (vs. Li), and then the charging of the batteries were cut-off at a current of about 0.01 C rate while maintaining the voltage of about 0.01 V in a constant voltage mode. Subsequently, the lithium batteries were discharged with a constant current of 0.1 C rate until the voltage reached 1.5 V (vs. Li) (the formation cycle).

The lithium batteries having gone through the formation cycle were charged with a constant current of 0.1 C rate at 25° C. until the voltage reached 0.01 V (vs. Li). Subsequently, the lithium batteries were discharged with a constant current of 0.1 C rate until the voltage reached 1.5 V (vs. Li) (the $1^{st}$ cycle).

The lithium batteries having gone through the $1^{st}$ cycle were charged with a constant current of 0.2 C rate at 25° C. until the voltage reached 0.01 V (vs. Li). Subsequently, the lithium batteries were discharged with a constant current of 0.2 C rate until the voltage reached 1.5 V (vs. Li) (the $2^{nd}$ cycle).

The lithium batteries having gone through the $2^{nd}$ cycle were charged with a constant current of 0.5 C rate at 25° C. until the voltage reached 0.01 V (vs. Li). Subsequently, the lithium batteries were discharged with a constant current of 0.2 C rate until the voltage reached 1.5 V (vs. Li) (the $3^{rd}$ cycle).

The lithium batteries having gone through the $3^{rd}$ cycle were charged with a constant current of 1.0 C rate at 25° C. until the voltage reached 0.01 V (vs. Li). Subsequently, the lithium batteries were discharged with a constant current of 0.2 C rate until the voltage reached 1.5 V (vs. Li) (the $4^{th}$ cycle).

The lithium batteries having gone through the $4^{th}$ cycle were charged with a constant current of 2.0 C rate at 25° C. until the voltage reached 0.01 V (vs. Li). Subsequently, the lithium batteries were discharged with a constant current of 0.2 C rate until the voltage reached 1.5 V (vs. Li) (the $5^{th}$ cycle).

The lithium batteries were rested for 10 minutes after every charging/discharging cycle. Some of the results of the room-temperature charge/discharge test are shown in Table 2.

Initial efficiency [%]=[discharge capacity at the $1^{st}$ cycle/charge capacity at the $1^{st}$ cycle]×100 Equation 1

High-rate characteristic [%]=[C rate charge capacity (charge capacity at the $n^{th}$)/0.2 C rate charge capacity (charge capacity at the $1^{st}$ cycle)]×100 Equation 2

TABLE 2

| | Initial efficiency [%] | 0.2 C/ 0.1 C [%] | 0.5 C/ 0.1 C [%] | 1.0 C/ 0.1 C [%] | 2.0 C/ 0.1 C [%] |
|---|---|---|---|---|---|
| Example 3 | 89.0 | 89.4 | 67.0 | 37.0 | 11.0 |
| Comparative Example 1 | 88.7 | 86.2 | 58.7 | 31.4 | 9.4 |
| Comparative Example 2 | 87.8 | 86.4 | 57.7 | 29.7 | 8.0 |

As shown in Table 2, the lithium battery including the porous composite of Example 3 had improved initial efficiency and further improved high-rate characteristics as compared to those of the lithium battery including the graphene-silica composite of Comparative Example 1 and the lithium battery including the carbonaceous conducting agent of Comparative Example 2. Evaluation Example 4: Evaluation of room-temperature charge/discharge characteristics, silicon-carbon composite anode active material Lithium batteries prepared in Examples 5 and 6 and Comparative Example 3 were charged at about 25° C. with a constant current of 0.1 C rate until a voltage reached 0.01 V (vs. Li), and then the charging of the batteries were cut-off at a current of about 0.01 C rate while maintaining the voltage of about 0.01 V in a constant voltage mode. Subsequently, the lithium batteries were discharged with a constant current of 0.1 C rate until the voltage reached 1.5 V (vs. Li) (the formation cycle).

The lithium batteries having gone through the formation cycle were charged with a constant current of 0.2 C rate at 25° C. until the voltage reached 0.01 V (vs. Li), and then the charging of the batteries were cut-off at a current of about 0.01 C rate while maintaining the voltage of about 0.01 V in a constant voltage mode. Subsequently, the lithium batteries were discharged with a constant current of 0.2 C rate until the voltage reached 1.5 V (vs. Li) (the $1^{st}$ cycle).

The lithium batteries having gone through the $1^{st}$ cycle were charged with a constant current of 1 C rate at 25° C. until the voltage reached 0.01 V (vs. Li), and then the charging of the batteries were cut-off at a current of about 0.01 C rate while maintaining the voltage of about 0.01 V in a constant voltage mode. Subsequently, the lithium batteries were discharged with a constant current of 1 C rate until the voltage reached 1.5 V (vs. Li) (the $2^{nd}$ cycle), and this cycle of charging and discharging was repeated 50 times under the same condition to measure a capacity retention rate.

The lithium batteries were rested for 10 minutes after every charging/discharging cycle. Some of the results of the room-temperature charge/discharge test are shown in Table 3.

The initial efficiency is calculated according to Equation 3 below, and the initial charge capacity is a discharge capacity at the formation cycle. The Capacity retention rate is calculated according to the Equation 4 below.

Initial efficiency [%]=[discharge capacity at the formation cycle/charge capacity at the formation cycle]×100 Equation 3

Capacity retention rate [%]=[discharge capacity at $50^{th}$ cycle/discharge capacity at $1^{st}$ cycle]×100 Equation 4

TABLE 3

| | Initial efficiency [%] | Initial discharge capacity [mAh/g] | Capacity retention rate [%] |
|---|---|---|---|
| Example 5 | 88.4 | 519 | 66.2 |
| Example 6 | 89.3 | 513 | — |
| Comparative Example 3 | 87.6 | 513 | 60.6 |

As shown in Table 3, the lithium battery including the porous composite of Example 5 had all initial efficiency, discharge capacity, and lifespan characteristics improved as compared to those of the lithium battery including the carbonaceous conducting agent of Comparative Example 3. The lithium battery including the porous composite of Example 6 had improved initial efficiency and the same discharge capacity as compared to those of the lithium battery including the carbonaceous conducting agent of Comparative Example 3.

Although not shown in Table 3, the lifespan characteristics of the lithium battery including the porous composite of Example 5 were similar to those of the lithium battery including the carbonaceous conducting agent of Comparative Example 3.

INDUSTRIAL APPLICABILITY

When a composite including nanopores of 50 nm or less and graphene is used in a lithium battery, cycle characteristics of the lithium battery may be improved.

The invention claimed is:

1. A porous composite comprising:

nanopores; and graphene, wherein the nanopores are arranged in a graphene matrix comprising the graphene, and a size of the nanopores is about 50 nanometers (nm) or less, wherein the graphene has at least one structure selected from a hemispherical structure or a spherical structure, a spiral structure in which hemispherical structures or spherical structures are connected to each other, and a cluster structure in which hemispherical structures or spherical structures are aggregated with each other, and the nanopores are distributed in the hemispherical structure or the spherical structure.

2. The porous composite of claim 1, wherein the graphene has a branched structure, the nanopores are dispersed in the branched structure, and the branched structure comprises a plurality of graphene particles contacting each other.

3. The porous composite of claim 1, wherein a size of the hemispherical structure is about 50 nm to about 300 nm, a size of the spherical structure is about 50 nm to about 300 nm, a size of the spiral structure is about 500 nm to about 100 μm, and a size of the cluster structure is about 0.5 mm to about 10 cm.

4. The porous composite of claim 1, wherein the porous composite has a crumpled faceted-ball structure or a planar structure, and the nanopores are distributed inside the crumpled faceted-ball structure.

5. The porous composite of claim 1, wherein the graphene extends from the nanopores by a distance of about 10 nm or less, includes at least 1 to 20 graphene layers, and has a total thickness of about 0.6 nm to about 12 nm.

6. The porous composite of claim 1, wherein a size of the nanopores is about 1 nm to about 20 nm.

7. The porous composite of claim 1, further comprising at least one selected from silica and $SiO_x$ (where $0<x<2$), which is a reduction product of the silica.

8. The porous composite of claim 7, an amount of the silicon (Si) comprised in the porous composite is about 0.1 atom % to about 5 atom %.

9. The porous composite of claim 7, wherein the porous composite comprises at least one metal selected from Groups 2 to 13, 15, and 16 of the periodic table and an oxide of the at least one metal, the porous composite further comprises at least one selected from a first metal oxide and a second metal oxide, which is a reduction product of the first metal oxide, the first metal oxide is at least one represented by a formula, $M_aO_b$ (where $0<a\leq3$ and $0<b\leq4$, when a is 1, 2, or 3, and b is an integer), the second metal oxide is at least one represented by a formula, $M_aO_c$ (where $0<a\leq3$ and $0<c<4$, when a is 1, 2, or 3, and c is not an integer), a ratio of b to a, b/a, of the first metal oxide is greater than a ratio of c to a, c/a, of the second metal oxide, and M is at least one metal selected from Groups 2 to 13, 15, and 16 of the periodic table.

10. The porous composite of claim 8, wherein the first metal oxide is at least one selected from $Al_2O_3$, NbO, $NbO_2$, $Nb_2O_5$, MgO, $Sc_2O_3$, $TiO_2$, $ZrO_2$, $V_2O_3$, $WO_2$, $MnO_2$, $Fe_2O_3$, $Co_3O_4$, PdO, CuO, AgO, ZnO, $Sb_2O_3$, and $SeO_2$, and the second metal oxide is at least one selected from $Al_2O_z$ (where $0<z<3$), $NbO_x$ (where $0<x<2.5$), $MgO_x$ (where $0<x<1$), $Sc_2O_z$ (where $0<z<3$), $TiO_y$ (where $0<y<2$), $ZrO_y$ (where $0<y<2$), $V_2O_z$ (where $0<z<3$), $WO_y$ (where $0<y<2$), $MnO_y$ (where $0<y<2$), $Fe_2O_z$ (where $0<z<3$), $Co_3O_w$ (where $0<w<4$), $PdO_x$ (where $0<x<1$), $CuO_x$ (where $0<x<1$), $AgO_x$ (where $0<x<1$), $ZnO_x$ (where $0<x<1$), $Sb_2O_z$ (where $0<z<3$), and $SeO_y$ (where $0<y<2$).

11. An anode comprising:

an anode active material; and the porous composite of claim 1.

12. The anode of claim 11, wherein the anode active material comprises at least one metal selected from the group consisting of silicon (Si), tin (Sn), aluminum (Al), germanium (Ge), lead (Pb), zinc (Zn), silver (Ag), and gold (Au); an alloy of the at least one metal; an oxide of the at least one metal; a nitride of the at least one metal; an oxynitride of the at least one metal; a carbide of the at least one metal; or a composite of the at least one metal with a carbonaceous material.

13. The anode of claim 11, wherein the anode active material comprises at least one selected from silicon, a silicon alloy, a silicon nitride, a silicon oxynitride, a silicon carbide, and a silicon-carbon composite.

14. The anode of claim 11, wherein the anode active material comprises a composite particle of silicon and carbon; and a carbonaceous coating layer arranged on a surface of the composite particle.

15. A lithium battery comprising:

a cathode;

an anode; and an electrolyte between the cathode and the anode, wherein at least one of the cathode and the anode comprises the porous composite of claim 1.

16. A method of preparing a porous composite, the method comprising:

preparing a composite precursor comprising at least one selected from silica or a first metal oxide and $SiO_x$ (where $0<x<2$) or a second metal oxide by supplying and heat-treating a reaction gas formed in the form of a carbon source gas to the silica or the first metal oxide; and preparing a porous composite by removing at least one selected from the silica or the first metal oxide and $SiO_x$ (where $0<x<2$) or a second metal oxide from the composite precursor, wherein the carbon source gas comprises a compound represented by Formula 1, or a mixed gas comprising a compound represented by Formula 1 and at least one selected from a compound represented by Formula 2 and an oxygen-containing gas represented by Formula 3, $$C_nH_{(2n+2-a)}[OH]_a \quad \text{Formula 1}$$

wherein, in Formula 1, n is 1 to 20, a is 1;

$$C_nH_{2n} \quad \text{Formula 2}$$

wherein, in Formula 2, n is 2 to 6;

$$C_xH_yO_z \quad \text{Formula 3}$$

wherein, in Formula 3, x is an integer of 0 or 1 to 20, y is an integer of 0 or 1 to 20, and z is an integer of 1 or 2, wherein the porous composite comprises nanopores and graphene having at least one structure selected from a hemispherical structure or a spherical structure, a spiral structure in which hemispherical structures or spherical structures are connected to each other, and a cluster structure in which hemispherical structures or spherical structures are aggregated with each other, and the nanopores are distributed in the hemispherical structure or the spherical structure.

17. The method of claim 16, wherein the preparing of the porous composite is performed by dry etching or wet etching.

18. The method of claim 16, wherein the wet etching is performed by an acid or a base.

19. The method of claim 16, wherein the preparing of the porous composite comprises adding the composite precursor to a basic solution and stirring the mixture.

* * * * *